United States Patent
Spann (10) Patent No.: US 10,000,423 B1
(45) Date of Patent: Jun. 19, 2018

(54) DIRECT METAL BONDING ON CARBON-COVERED CERAMIC CONTACT PROJECTIONS OF A CERAMIC CARRIER

(71) Applicant: IXYS Corporation, Milpitas, CA (US)

(72) Inventor: Thomas Spann, Furth (DE)

(73) Assignee: IXYS, LLC, Milpitas, CA (US)

( * ) Notice: Subject to any disclaimer, the term of this patent is extended or adjusted under 35 U.S.C. 154(b) by 21 days.

(21) Appl. No.: 15/088,088

(22) Filed: Mar. 31, 2016

(51) Int. Cl.
*C04B 37/00* (2006.01)
*B23K 1/20* (2006.01)
*C04B 37/02* (2006.01)

(52) U.S. Cl.
CPC ............. *C04B 37/021* (2013.01); *B23K 1/20* (2013.01)

(58) Field of Classification Search
None
See application file for complete search history.

(56) References Cited

U.S. PATENT DOCUMENTS

| | | | |
|---|---|---|---|
| 3,994,430 A * | 11/1976 | Cusano | B23K 1/19 228/122.1 |
| 4,409,278 A | 10/1983 | Jochym | 428/163 |
| 4,483,810 A | 11/1984 | Bunk et al. | 264/60 |
| 4,505,418 A | 3/1985 | Neidig et al. | 228/122 |
| 4,985,097 A | 1/1991 | Matsumura et al. | 156/87 |
| 5,931,368 A * | 8/1999 | Hadar | B23K 20/005 228/4.5 |
| 6,066,219 A | 5/2000 | Schulz-Harder et al. | 158/89.11 |
| 6,404,065 B1 | 6/2002 | Choi | 257/782 |
| 6,583,505 B2 | 6/2003 | Choi | 257/730 |
| 6,670,216 B2 | 12/2003 | Strauch | 438/106 |
| 6,798,060 B2 | 9/2004 | Strauch | 257/705 |
| 7,005,734 B2 | 2/2006 | Choi et al. | 257/686 |
| 8,056,230 B2 | 11/2011 | Schulz-Harder | 29/890.039 |
| 8,377,240 B2 | 2/2013 | Schulz-Harder et al. | 156/89.18 |
| 8,716,864 B2 | 5/2014 | Zommer | 257/765 |
| 8,876,996 B2 | 11/2014 | Weidenauer et al. | 156/89.27 |
| 2007/0261778 A1 * | 11/2007 | Schulz-Harder | B32B 18/00 156/89.18 |
| 2009/0152237 A1 | 6/2009 | Chiang et al. | 216/33 |
| 2009/0232972 A1 | 9/2009 | Schulz-Harder | 427/99.2 |
| 2011/0274888 A1 | 11/2011 | Tang et al. | 428/189 |
| 2011/0303348 A1 * | 12/2011 | Weidenauer | C04B 37/021 156/89.27 |
| 2012/0305281 A1 | 12/2012 | Knoll | 174/50 |
| 2015/0230334 A1 | 8/2015 | Schmidt et al. | H05K 1/0306 |

* cited by examiner

*Primary Examiner* — Devang R Patel
(74) *Attorney, Agent, or Firm* — Imperium Patent Works; Amir V. Adibi (57) ABSTRACT

Top and bottom metal plates of a DMB panel stack are simultaneously direct-bonded to the central ceramic sheet in a single high-temperature step. During this step, the DMB panel rests on an array of very small upwardly projecting ceramic contacts of a ceramic carrier. An amount of unoxidized carbon (e.g., a layer of graphite) is disposed on each contact projection such that an amount of carbon is disposed between the top of the contact projection and the metal oxide skin of the bottom metal plate. The carbon bonds with oxygen from the metal oxide skin, thereby preventing connection or direct-bonding of the ceramic contact projection to the second metal plate. This reduces imperfections in the metal of the bottom plate and reduces the amount of ceramic particles bonded to metal at contact sites. As a result, less post-bonding processing is required to make a high quality DMB substrate.

22 Claims, 6 Drawing Sheets

PLACE THE DMB PANEL STACK ON THE CONTACT PROJECTIONS OF THE CARRIER

FIG. 1

UNITARY CAST AND SINTERED
CERAMIC CARRIER

FIG. 2

APPLY AN AMOUNT OF UNOXIDIZED CARBON TO EACH
CONTACT PROJECTION OF THE CARRIER

FIG. 3

CARRIER WITH UNOXIDIZED CARBON APPLIED

FIG. 4

A FEW MICRONS OF UNOXIDIZED CARBON COVERS
THE TIP OF EACH CONTACT PROJECTION

FIG. 5

PLACE THE DMB PANEL STACK ON THE
CONTACT PROJECTIONS OF THE CARRIER

FIG. 6

ONE CONTACT PROJECTION OF THE CARRIER
(BEFORE THE HIGH-TEMPERATURE DIRECT-BONDING STEP)

FIG. 7

IN A SINGLE HIGH-TEMPERATURE DIRECT-BONDING STEP CAUSING THE METAL PLATES TO BE SIMULATANEOUSLY BONDED TO THE CERAMIC

FIG. 8

IN A SINGLE HIGH-TEMPERATURE DIRECT-BONDING STEP CAUSING THE METAL PLATES TO BE SIMULATANEOUSLY BONDED TO THE CERAMIC

FIG. 9

BOTTOM OF THE DMB PANEL AFTER DIRECT-BONDING
(<5% OF THE SURFACE CONTACTED CONTACT PROJECTIONS)

FIG. 10

DIRECT METAL BONDING ON CARBON-COVERED CERAMIC CONTACT PROJECTIONS OF A CERAMIC CARRIER

TECHNICAL FIELD

The described embodiments relate to the manufacture of Direct-Metal Bonded (DMB) panels and substrates such as DCB (Direct Copper Bonded) panels and substrates and DAB (Direct Aluminum Bonded) panels and substrates, and to related structures.

BACKGROUND INFORMATION

Direct-Metal Bonded (DMB) substrates (also called Direct Bonded Metal (DBM) substrates are used extensively in the power semiconductor industry. DMB substrates include Direct Copper Bonded (DCB) substrates (also called Direct-Bonded Copper (DBC) substrates) and Direct Aluminum Bonded (DAB) substrates (also called Direct-Bonded Aluminum (DBA) substrates.

In the case of the metal being copper, a DCB substrate generally includes a ceramic sheet substrate member, to which a thinner top plate of copper and a thinner bottom plate of copper are bonded. After direct bonding of the copper plates to the ceramic substrate member, the copper plates are patterned and etched so that islands of desired shapes are formed out of the copper on the top and bottom of the panel. The copper is then typically plated with nickel or some other plating metal. The resulting DCB panel is then cut into smaller individual DCB substrates. One or more semiconductor dice are generally surface mount attached to the top metal of a DCB substrate, and the DCB substrate/die assembly is incorporated into a semiconductor device package to form a final packaged semiconductor device.

There are numerous methods for making DCB substrates. A typical ceramic panel is about 150 millimeters wide by 200 millimeters long and about half a millimeter thick. Such a ceramic panel is made to rest on a U-shaped carrier. A thin plate of thinly oxidized copper metal is placed on top of the ceramic panel. The assemblage is placed in a furnace such that the copper plate bonds to the ceramic panel. The bonded structure is removed from the furnace, is allowed to cool at least somewhat, and is flipped over, and is put back onto the U-shaped carrier. A second thin plate of slightly oxidized copper is placed on the ceramic panel. The assemblage is placed back into the furnace and is heated up again such that the second plate of metal is bonded to the ceramic. In this way, a first sheet of copper is direct-bonded to a top surface of the ceramic panel and a second sheet of copper is direct-bonded to a bottom surface of the ceramic panel. There is a first heating step, then a first cooling, then a second heating step, then a second cooling. Such multiple heating and cooling steps can cause problems including bending and warping of the final DCB panel. The final DCB panel is patterned, plated, and cut into individual DCB substrates.

Another method for making a DCB substrate is set forth in U.S. Pat. No. 8,377,240. Advantageously, the method allows both copper plates to be direct-bonded to a central ceramic panel in a single heating step. A powder of a temperature resistant material is baked or otherwise bonded together to form a so-called separating layer. One such separating layer structure is disposed on each raised area of a carrier. A DCB panel stack involving a slightly oxidized bottom copper plate, a ceramic panel, and a slightly oxidized top copper plate is placed onto the carrier. The carrier with the DCB panel stack resting on it is then placed into a furnace. The copper plates are direct-bonded to the ceramic panel in a single high temperature heating step. In the direct-bonding process, ceramic particles from the separating layer adhere to the bottom metal plate. These ceramic particles are then removed by brushing and/or chemical etching. The resulting DCB panel is then patterned, plated, and cut into individual DCB substrates.

Additional methods for making DCB substrates are set forth in U.S. Pat. No. 8,876,996. In one method, a special ceramic carrier is used. The ceramic carrier has rows of upward facing pyramid-shaped projections. The tips of these pyramid-shaped projections are flat to form very small contact surfaces. A DCB panel stack involving a slightly oxidized bottom copper plate, a ceramic panel, and a slightly oxidized top copper plate is placed to rest on the contact surfaces of the pyramid-shaped projections of the carrier. The assemblage is heated so that the top and bottom copper plates are direct-bonded to the ceramic panel in a single heating step. As explained in U.S. Pat. No. 8,876,996, the carrier offers the advantage of there being no need for an additional separating layer. The patent teaches that due to the special structuring of the carrier, with the very small contact points, the bonded DCB assemblage can be detached from the carrier after the bond process, free of any residue. The resulting DCB panel is patterned, nickel plated, and cut into individual DCB substrates.

DCB substrates have been made commercially and successfully with these methods and techniques for many years.

SUMMARY

The top and bottom metal plates of a DMB panel stack are simultaneously direct-bonded to a central ceramic sheet of the stack in a single high-temperature direct-bonding step. During this direct-bonding step, the bottom surface of the bottom metal plate rests on an array of very small upwardly projecting ceramic contacts of a unitary ceramic carrier. In one example, the contact surface of each ceramic contact projection is less than fifty square millimeters. An amount of unoxidized carbon (for example, a layer of graphite a few microns thick) is disposed on the small contact surface of each of the contact projections such that an amount of unoxidized carbon is disposed between the top of the contact projection and the bottom surface of the metal oxide skin of the bottom metal plate. Less than five percent of the surface area of the bottom surface of the bottom metal plate is in contact with unoxidized carbon at this point in the process. The unoxidized carbon has affinity for oxygen. During the subsequent high-temperature direct-bonding step, the carbon bonds with oxygen from the metal oxide skin of the bottom of the bottom metal plate, thereby preventing a metal oxide eutectic from forming and bonding ceramic of the top of the contact projection to the bottom of the second metal plate. Preventing or reducing the ceramic-to-metal bonding reduces or eliminates imperfections that would otherwise be left in the metal of the bottom plate. Preventing or reducing the ceramic-to-metal bonding also reduces the amount of ceramic that is left bonded to the metal at contact sites after the bonded DMB has been removed from the carrier. As a result of reducing or preventing ceramic-to-metal bonding at the contact sites, less post-bonding processing of the bottom surface of the bottom metal plate is required to make a high quality DMB substrate. The metal layers of the bonded DMB panel stack are patterned. The patterned metal layers of the DMB panel are then optionally nickel plated, and the resulting DMB panel is cut into individual DMB substrates.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings. In the description and claims below, when a first object is referred to as being disposed "over" or "on" a second object, it is to be understood that the first object can be directly on the second object, or an intervening object may be present between the first and second objects. Similarly, terms such as "top", "up", "down", "lower", "under", "below", "beneath" and "bottom" are used herein to describe relative orientations between different parts of the structure being described, and it is to be understood that the overall structure being described can actually be oriented in any way in three-dimensional space.

Despite the successful commercial use of conventional single-heating step DCB direct-bonding methods as set forth in the background section of this patent document, and despite conventional wisdom regarding those methods, the inventor has recognized that conventional DCB manufacturing processes generally require some kind of post-processing step of brushing and/or chemical etching and/or grinding step to clean the bottom surface of the bottom copper plate where the bottom copper plate contacted the carrier during the direct bonding heating step. Immediately prior to a direct-bonding heating step, pure unoxidized copper in not in contact with ceramic of the ceramic panel but rather copper oxide of the very thin oxidized surface of the copper plate is in contact with the ceramic of the ceramic panel. Upon heating, this thin layer of copper oxide and some unoxidized copper are converted into a eutectic material. The eutectic material has a lower melting point than the higher melting point of the unoxidized copper in the center of the copper plate, and that also has a lower melting point than the higher melting point of the ceramic (for example, alumina) of the ceramic panel. The actual physics and chemistry of the direct-bonding process is complex, but in a simplified explanation the melted eutectic forms a glue-like liquid. This glue-like liquid then penetrates microvoids in the ceramic at the surface of the ceramic panel. Upon penetration, a complex chemical reaction or interaction takes place between the eutectic and the ceramic of the ceramic panel. The eutectic liquid is largely absorbed into the surface of the ceramic and leaves the copper plate direct-bonded to the ceramic panel. Regardless of the details of the complex chemistry involved, oxygen (for example, from the copper oxide) is necessary for the direct-bonding chemical reaction to take place.

In the case of a DCB stack resting on a ceramic powder separating layer on raised portions of a carrier as described in U.S. Pat. No. 8,377,240, direct bonding of copper to ceramic also takes place on the bottom surface of the bottom copper plate where the bottom of the thin copper oxide of the bottom copper plate contacts the ceramic powder separating layer on the top of the carrier. The thin copper oxide allows the eutectic to be formed, and the eutectic then reacts with ceramic particles of the separating layer. Due to the structure of the carrier, the amount of these particles that end up bonded to the bottom of the bottom copper plate is significant. In the case of a method set forth in U.S. Pat. No. 8,876,996, the bottom copper plate of the DCB stack is also contacting ceramic of the carrier at the very small contact points on the small tips of the pyramid-shaped projections of the carrier. Although the degree of direct-bonding to the ceramic of the carrier might seem negligible due to how small the contact points are and due to how little of the bottom surface of the bottom copper plate touches the carrier, there is nonetheless some direct bonding that takes place. It has been found that the DCB direct-bonding process leaves irregularities and defects in the grain structure of the copper at the contact points. These irregularities and defects can extend upward into the copper plate a distance of about seventy microns. In addition to these penetrating imperfections in the structure of the copper, the tips of the small pyramid-shaped projections stick into the eutectic liquid, and after cooling and solidification the pyramid-shaped projections remain slightly embedded and physically stuck. Accordingly, after the bonding process has been completed there is a slight force that is required to separate the direct-bonded DCB panel from the carrier. This separating force has been found to break off ceramic particles from the very small pyramid-shaped projections of the carrier. This damages the carrier and reduces the number of times a carrier should be used. In addition, undesirable ceramic particles are left embedded in the bottom copper plate. If a high quality DCB panel is to be made, then the slight imperfections in the metal structure and the embedded ceramic particles are to be removed. In the case where the imperfections at the contact points extend upward into the bottom copper plate a distance of seventy microns, three times that depth of copper is ground away off of the bottom surface bottom copper plate. This grinding of the bottom surface of the bottom copper plate has a cost. The grinding step adds to the cost of the DCB if a high quality DCB with no imperfections is to be made.

Figure 1:
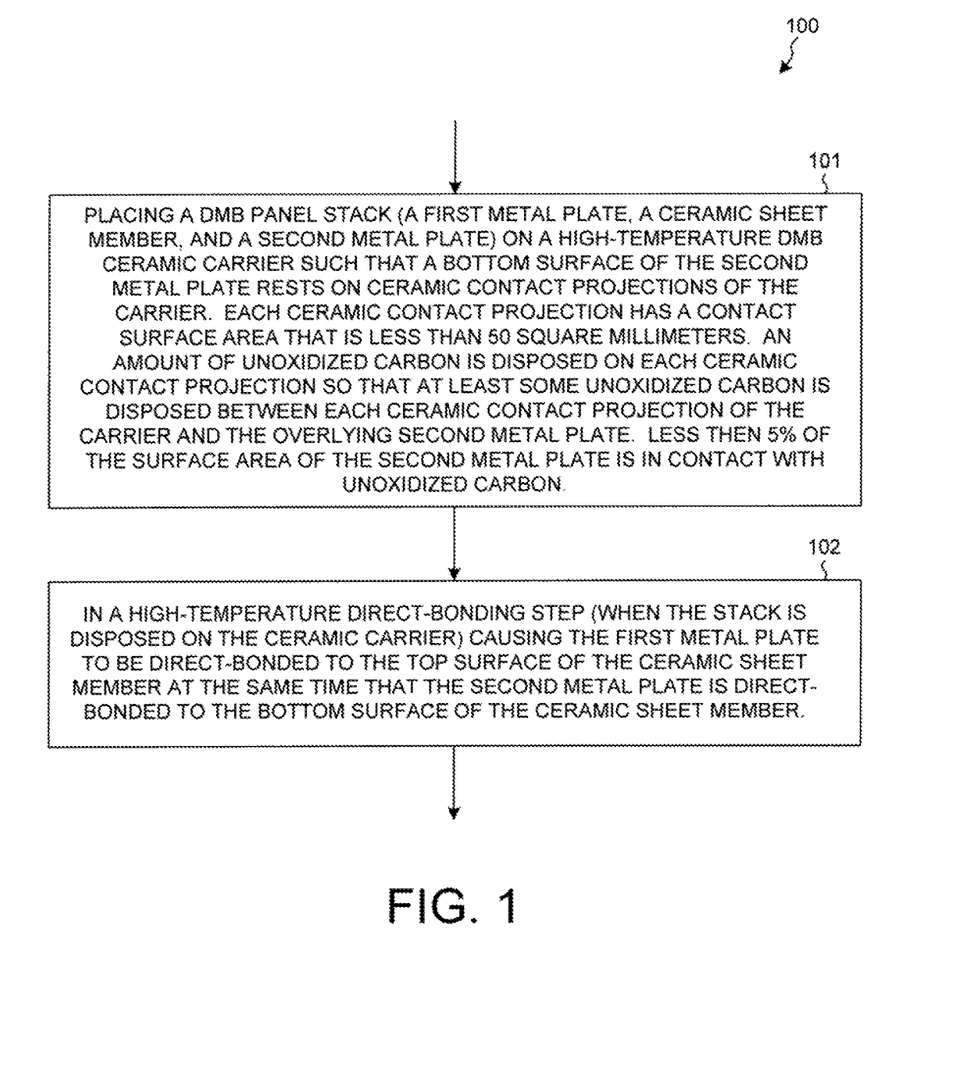
FIG. 1 is a flowchart of a method in accordance with one novel aspect.

FIG. 1 is a flowchart of a two-step method 100 in accordance with one novel aspect.

In a first step (step 101), a DMB (Direct Metal Bonded) panel stack is placed on a high temperature ceramic DMB carrier. The DMB panel stack includes a first top metal plate, a ceramic sheet member, and a second top metal plate. In one example, the top metal plate is a 0.3 millimeter thick sheet of copper whose outer surfaces have been oxidized in a liquid chemical treatment into a thin, one micron thick, outer layer that includes copper oxide. Likewise, the bottom metal plate is an identical 0.3 millimeter thick sheet of copper that has a thin, one micron thick, outer layer that includes copper oxide. The ceramic sheet member is a rectangular panel of alumina ($Al_2O_3$) that is about 0.63 millimeters thick, and about 210 millimeters long, and about 138 millimeters wide. The ceramic sheet member, the first top metal plate, and the second bottom metal plate are all of this same approximate size.

This DMB panel stack is placed down onto the ceramic DMB carrier such that the bottom surface of the second bottom metal plate rests on the small upward-facing ceramic contact projections of the ceramic DMB carrier. In one example, the ceramic DMB carrier is the carrier illustrated in FIG. 2. Each contact projection has a contact surface area that is less than fifty square millimeters. An amount of unoxidized carbon (for example, graphite) is disposed on the contact surface of each ceramic contact projection so that at least some unoxidized carbon is disposed between each ceramic contact projection of the carrier and the bottom of the overlying second metal plate. In one example, a few microns of graphite is disposed on the contact surface of each contact projection. At this point in the method, less than five percent of the surface area of the bottom surface of the second bottom metal plate is in contact with unoxidized carbon.

In a second step (step 102), a high-temperature direct-bonding step is carried out. The DMB stack on the carrier is placed in a furnace and the assemblage is heated to temperature of about 1072 degrees Celsius in an atmosphere that is substantially devoid of oxygen for a duration of about one hour. In the high-temperature direct-bonding step, the first top metal plate is direct-bonded to the top surface of the ceramic sheet at the same time that the second bottom metal plate is direct-bonded to the bottom surface of the ceramic sheet member. During the high-temperature direct-bonding step, the carbon on each contact projection acts to prevent the ceramic of the contact projection of the carrier from being connected and/or direct-bonded to the bottom of the second bottom copper plate. The unoxidized carbon on the contact surface of the contact projection has a high affinity for oxygen. As result, when the DMB stack is heated, oxygen of the copper oxide is removed and is made to bond with the carbon, thereby oxidizing the carbon. This removes the oxygen that is necessary for formation of the copper oxide eutectic that normally forms between the ceramic sheet member and a metal plate. As a result, the eutectic glue-like liquid that forms between the copper plates and the ceramic sheet member does not form at, or does not penetrate into, the microvoids/porosity of the ceramic of the contact projections of the carrier. The carbon is observed to prevent the metal bottom surface of the DMB stack from being connected and/or direct-bonded to the ceramic contact projections of the carrier. Prior art imperfections in the copper of the bottom copper plate that occur in the prior art method of U.S. Pat. No. 8,876,996 are minimized. The prior art breaking off of ceramic particles from contact projections that may occur when the method of U.S. Pat. No. 8,876,996 is carried out is also minimized or eliminated. Accordingly, an up to seventy micron deep grinding step need not be employed in order to grind down the bottom surface of the second bottom metal plate just to remove direct-bonded ceramic particles and prior art metal imperfections, but rather a less expensive slight wet etching is all that is required to make a high quality DMB panel. After this wet etching, the metal plates of the DMB panel are patterned and etched into islands. The metal islands are then optionally plated with nickel. The resulting DMB panel is then cut into individual DMB substrates.

Figure 2:
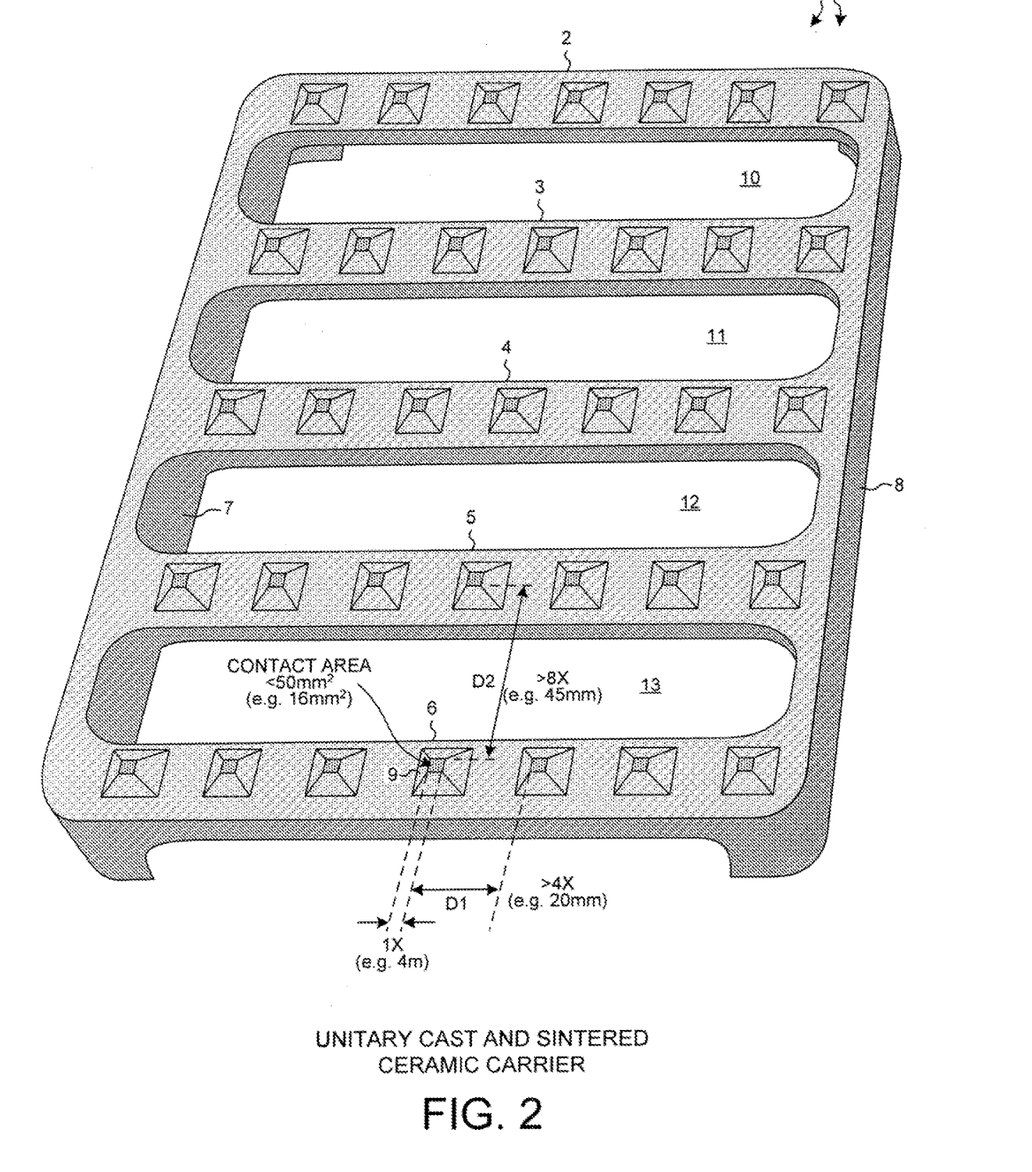
FIG. 2 is a perspective diagram of a DMB ceramic carrier used in the method of FIG. 1

FIG. 2 is a perspective diagram of the DMB ceramic carrier 1 used in the method of FIG. 1. Silicon carbide powder is cast, and then fired and sintered to form the unitary ceramic structure illustrated. The ceramic of the carrier is therefore somewhat porous. The carrier has five bridges 2-6 that extend from a first base rail 7 to a second base rail 8. There are seven upward-extending four-sided pyramid-shaped contact projections on each bridge. Reference numeral 9 identifies one such pyramid/shaped contact projection. Each pyramid-shaped contact projection has a square planar contact surface. All the contact surfaces of all the contact projections are disposed in the same plane. Openings 10-13 allow for good gas flow and heat flow underneath, around and through the carrier structure when a DMB panel stack is being direct-bonded on the carrier. Homogeneous temperature is needed around the bottom metal plate including at the contact projections during the high-temperature direct-bonding step. The distance D1 between contact surfaces in a first direction (the direction along a bridge) is more than eight times the width of a contact surface. The distance D2 contact surfaces in a second direction (parallel to the base rails) perpendicular to the first direction is more than four times the width of contact surface. In one example, a contact surface is a square surface of less than fifty square millimeters, the distance D1 is roughly twenty millimeters, and the distance D2 is roughly forty-five millimeters. Each pyramid-shaped contact projection sticks up from the bridge from which it projects a distance of four millimeters.

Figure 3:
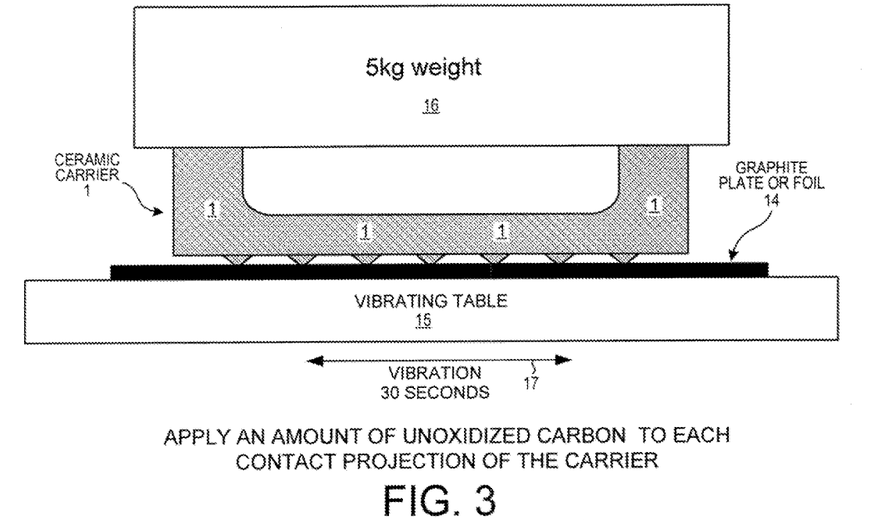
FIG. 3 illustrates one way that the contact surfaces on the tips of the contact projections of the ceramic carrier can be coated with unoxidized carbon.

FIG. 3 illustrates one way that the contact areas of the contact projections of the ceramic carrier 1 can be coated with unoxidized carbon. The ceramic carrier 1 is flipped upside down so that the contact projections face downward and rest on an upward facing surface of a graphite plate 14. The graphite plate is resting on a vibrating table 15. A weight 16, such as a five kilogram block, is placed on the ceramic carrier 1. The vibrating table vibrates back and forth in the direction of arrow 17 for about thirty seconds.

Figure 4:
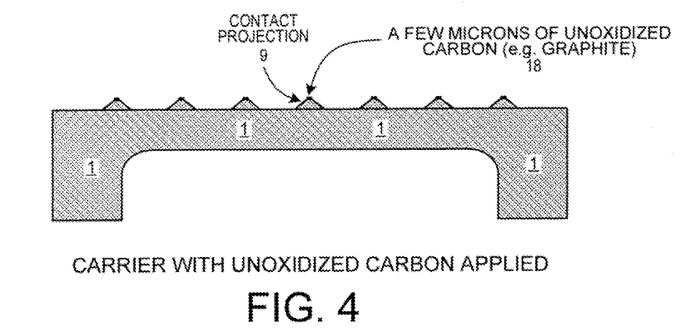
FIG. 4 illustrates the ceramic carrier after unoxidized carbon has been applied to the tips of the contact projections of the carrier.

FIG. 4 illustrates the ceramic carrier 1 after the graphite has been applied. A layer a few microns thick (for example, about two microns) of graphite is disposed on each contact surface of each of the contact projections of the carrier. Layer 18 is a layer of graphite on contact projection 9. No special electrostatic conditioning is required to get adequate adherence of the graphite to contact surfaces.

Figure 5:
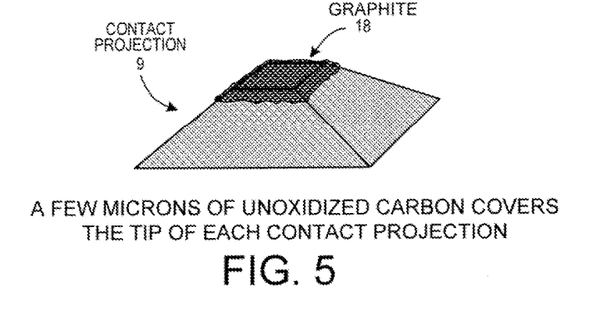
FIG. 5 is a perspective diagram that illustrates a layer of unoxidized carbon covering the square top contact surface on the tip of a contact projection of the carrier.

FIG. 5 is a perspective diagram that illustrates the layer 18 of graphite covering the square top contact surface of contact projection 9.

Figure 6:
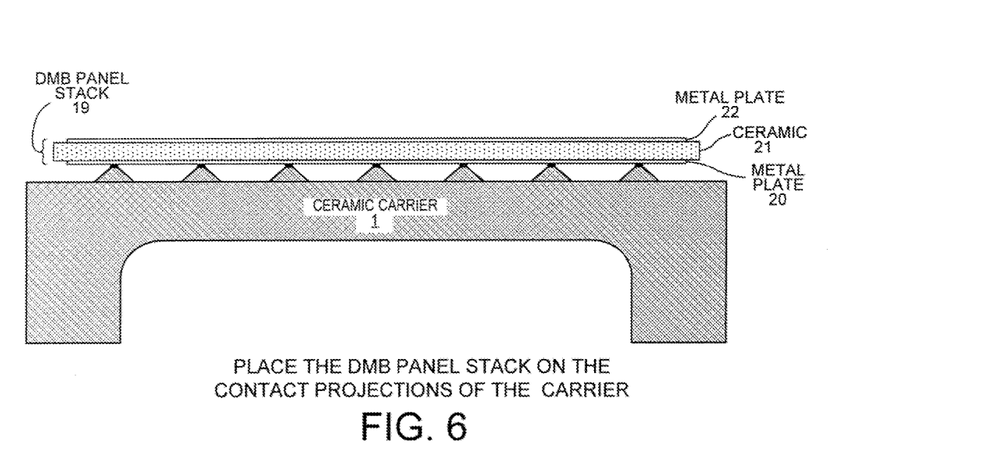
FIG. 6 is a cross-sectional diagram that shows the DMB panel stack disposed on the ceramic carrier immediately before the high-temperature direct-bonding step is initiated.

FIG. 6 is a cross-sectional diagram that shows the next step of placing the DMB panel stack 19 on the contact projections of the carrier 1. The DMB panel stack 19 comprises the bottom metal plate 20, the central ceramic sheet member 21, and the top metal plate 22. In the illustrated example, the bottom plate 20 and the top plate 22 are identical lightly oxidized copper sheets that are about 0.3 millimeters thick. The central ceramic sheet 21 is a panel of alumina ($Al_2O_3$) that is about 0.63 millimeters thick. The ceramic sheet 21 is a panel that is about 210 millimeters long by about 138 millimeters wide. The metal plates 20 and 22 are both of the same size and are slightly smaller than the ceramic panel 21.

Figure 7:
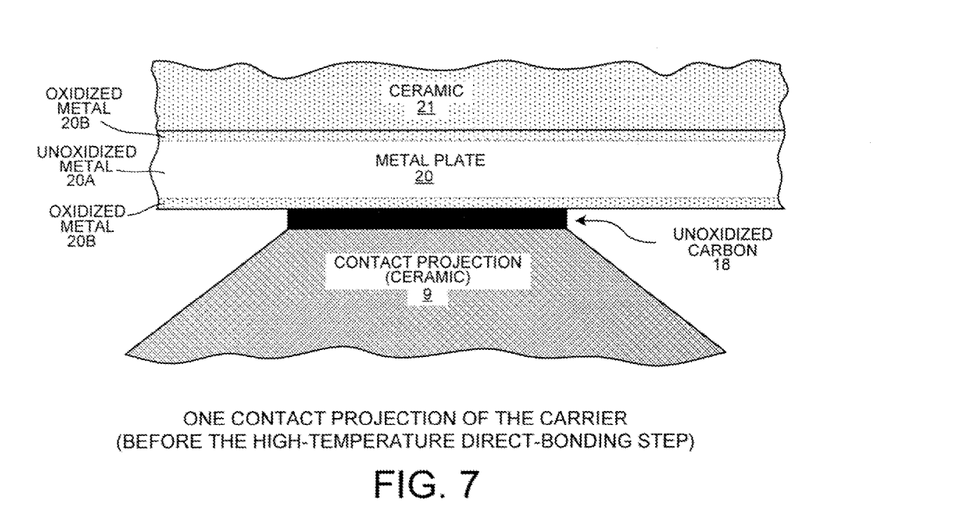
FIG. 7 shows one of the contact projections of the ceramic carrier at a time immediately before the high-temperature direct-bonding step is initiated.

FIG. 7 shows one of the contact projections 9 at a time immediately before the high-temperature direct-bonding step is initiated. Note the layer 18 of unoxidized carbon (in this example it is a 2 micron thick layer of graphite) that separates the ceramic of the contact projection 9 from the oxidized metal portion 20B (in this example an about one micron thick skin of copper oxide) on the bottom of the bottom metal plate 20. In one example, the layer 18 contains substantially no ceramic particles, but rather involves only a readily oxidizable material such as graphite. Reference numeral 20A identifies the central unoxidized copper portion of the plate 20. Reference numeral 20B identifies the about one micron thick copper oxide skin of the plate 20. This copper oxide skin 20B may include an amount of unoxidized copper as well as copper oxide.

Figure 8:
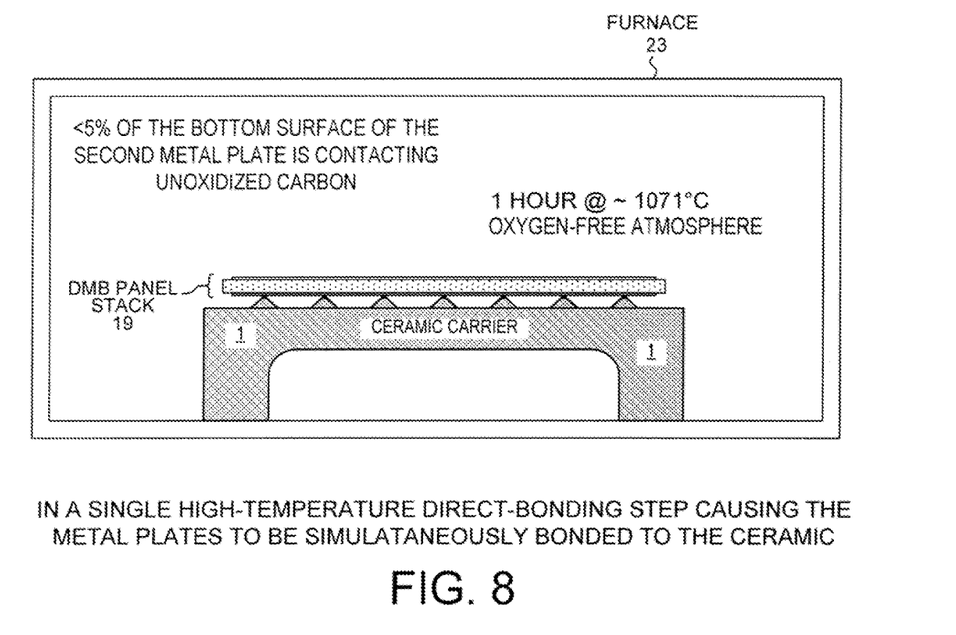
FIG. 8 is a cross-sectional diagram that illustrates the high-temperature direct-bonding step in which the DMB panel stack is direct-bonded together.

FIG. 8 is a cross-sectional diagram that illustrates the high-temperature direct-bonding step in which the DMB panel stack 19 is direct-bonded together. The DMB panel stack 19 is placed on the carrier 1, and the carrier/DMB stack assemblage is placed in a furnace 23. The DMB panel stack 19 is maintained at about 1071 degrees Celsius in a substantially oxygen-free atmosphere in the furnace 23 for about one hour. In one example, there is very little unoxidized carbon present in the furnace. In one example, the total volume of unoxidized carbon in furnace 23 is not substantially more than the area of the combined contact areas of all the contact projections of the carrier 1, multiplied by the average thickness of the graphite on those contact areas. Excess unoxidized carbon is to be kept out of furnace 23.

Figure 9:
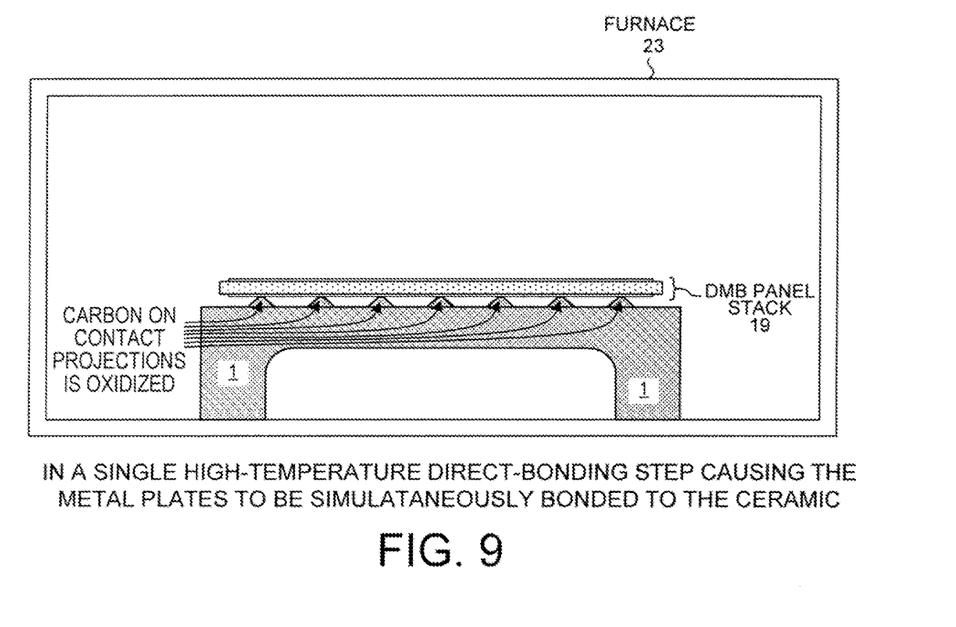
FIG. 9 is a cross-sectional diagram that illustrates the result of the high-temperature direct-bonding step.

FIG. 9 is a cross-sectional diagram that illustrates the result of the high-temperature direct-bonding step. The metal plates 20 and 22 of DMB panel stack 19 have been direct-bonded to the central ceramic sheet 21. During the bonding step, oxygen from the metal oxide layer of the bottom metal plate 20 has disassociated from metal of the bottom metal plate in the areas of the contact projections and has bonded to the carbon that was placed on the contact projections. The removal of oxygen from the metal prevents the formation of the complex glue-like metal-oxide/metal eutectic at the contact projection locations. Accordingly, the bonded DMB panel stack 19 is not left connected or direct-bonded to the carrier 1.

Figure 10:
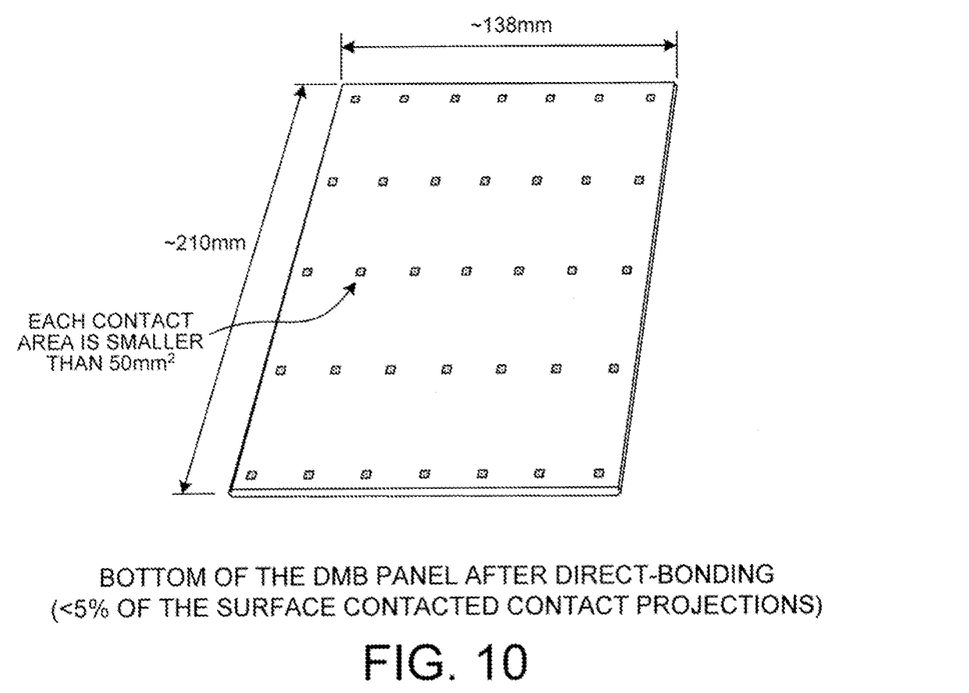
FIG. 10 is a perspective diagram of the bottom of the DMB panel stack after direct-bonding.

FIG. 10 is a perspective diagram of the bottom of the DMB panel stack 19 after direct-bonding. Each contact area is an area less than fifty square millimeters. Less than five percent of the bottom surface of the bottom plate 20 shows marks due to contact with contact projections of the ceramic carrier.

Although certain specific embodiments are described above for instructional purposes, the teachings of this patent document have general applicability and are not limited to the specific embodiments described above. The method is usable in the making of DCB substrates and in the making of DAB substrates. Accordingly, various modifications, adaptations, and combinations of various features of the described embodiments can be practiced without departing from the scope of the invention as set forth in the claims.

What is claimed is:

1. A method comprising:
   placing a ceramic carrier in contact with a unoxidized carbon member such that ceramic contact projections touch unoxidized carbon of the unoxidized carbon member;
   moving the ceramic carrier with respect to the unoxidized carbon member such that unoxidized carbon is left disposed on the ceramic projections of the ceramic carrier;
   placing a Direct Metal Bonded (DMB) panel stack on the ceramic carrier such that a bottom surface of a second metal plate of the stack rests on the ceramic contact projections of the ceramic carrier, wherein the stack comprises a ceramic sheet member, a first metal plate disposed in contact with a top surface of the ceramic sheet member, and the second metal plate disposed in contact with a bottom surface of the ceramic sheet member, and wherein a separation layer comprising an amount of unoxidized carbon is disposed on each ceramic contact projection so that at least some unoxidized carbon is disposed between the ceramic contact projection and the overlying second metal plate of the stack; and
   in a high-temperature direct-bonding step, when the stack is disposed on the ceramic carrier, causing the first metal plate to be direct-bonded to the top surface of the ceramic sheet member at the same time that the second metal plate is direct-bonded to the bottom surface of the ceramic sheet member.

2. The method of claim 1, wherein each ceramic contact projection has a contact surface area of less than fifty square millimeters.

3. The method of claim 1, wherein the ceramic contact projections of the ceramic carrier form a two-dimensional array.

4. The method of claim 1, wherein less than five percent of the bottom surface of the second metal plate is in contact with unoxidized carbon at the beginning of the high-temperature direct-bonding step.

5. The method of claim 1, wherein each ceramic contact projection has a contact area of less than fifty square millimeters, wherein the ceramic contact projections of the ceramic carrier form a two-dimensional array, and wherein less than five percent of the bottom surface of the second metal plate is in contact with unoxidized carbon at the beginning of the high-temperature direct-bonding step.

6. The method of claim 1, wherein the unoxidized carbon is graphite.

7. The method of claim 1, wherein at least some of the unoxidized carbon oxidizes during the high-temperature direct-bonding step.

8. The method of claim 1, wherein oxygen from a metal oxide layer of the second metal plate disassociates with metal of the second metal plate in the high-temperature direct-bonding step and chemically reacts with carbon.

9. The method of claim 1, wherein the high-temperature direct-bonding step occurs in a gaseous atmosphere that is substantially devoid of oxygen gas.

10. The method of claim 1, wherein the first metal plate in the placing step is a copper plate that has a thin copper oxide skin, and wherein the second metal plate in the placing step is a copper plate that has a thin copper oxide skin.

11. A method comprising:
    placing a Direct Copper Bonded (DCB) panel stack on a ceramic carrier such that a bottom surface of a second copper plate of the stack rests on a plurality of ceramic contact projections of the ceramic carrier, wherein the stack comprises a ceramic sheet member, a first copper plate disposed in contact with a top surface of the ceramic sheet member, and the second copper plate disposed in contact with a bottom surface of the ceramic sheet member, wherein a separation layer comprising an amount of unoxidized carbon is disposed on each ceramic contact projection so that at least some unoxidized carbon is disposed between the ceramic contact projection and the overlying second copper plate of the stack in a high-temperature direct-bonding step, when the stack is disposed on the ceramic carrier, causing the first copper plate to be direct-bonded to the top surface of the ceramic sheet member at the same time that the second copper plate is direct-bonded to the bottom surface of the ceramic sheet member, wherein less than five percent of the bottom surface of the second copper plate is in contact with unoxidized carbon at the beginning of the high-temperature direct-bonding step;

placing the ceramic carrier in contact with a graphite member such that the ceramic contact projections touch graphite of the graphite member; and moving the ceramic carrier with respect to the graphite member such that graphite is left disposed on the ceramic projections of the ceramic carrier, wherein the step of placing the ceramic carrier on the graphite member and the step of moving the ceramic carrier with respect to the graphite member both occur before the step of placing the DCB panel stack on the ceramic carrier.

12. The method of claim 11, wherein the first copper plate in the placing step is a copper plate that has a thin copper oxide skin, and wherein the second metal plate in the placing step is a copper plate that has a thin copper oxide skin.

13. The method of claim 12, wherein the unoxidized carbon is graphite.

14. The method of claim 12, wherein the bottom surface of the second copper plate is not in contact with any ceramic material during the high-temperature direct-bonding step.

15. A method comprising:
placing a ceramic carrier in contact with a unoxidized material member such that ceramic contact projections touch unoxidized material of the unoxidized material member;
moving the ceramic carrier with respect to the unoxidized material member such that unoxidized material is left disposed on the ceramic projections of the ceramic carrier;
placing a Direct Metal Bonded (DMB) panel stack on a ceramic carrier such that a bottom surface of a second metal plate of the stack rests on a plurality of ceramic contact projections of the ceramic carrier, wherein the stack comprises a ceramic sheet member, a first metal plate disposed in contact with a top surface of the ceramic sheet member, and the second metal plate disposed in contact with a bottom surface of the ceramic sheet member, wherein a layer comprising an unoxidized material is disposed on each ceramic contact projection so that at least some of the unoxidized material is disposed between the ceramic contact projection and the overlying second metal plate of the stack; and
in a high-temperature direct-bonding step, when the stack is disposed on the ceramic carrier, causing the first metal plate to be direct-bonded to the top surface of the ceramic sheet member at the same time that the second metal plate is direct-bonded to the bottom surface of the ceramic sheet member, wherein during the high-temperature direct-bonding step oxygen from a metal oxide layer of the second metal plate disassociates with metal of the second metal plate and oxidizes at least some of the unoxidized material.

16. The method of claim 15, wherein the layer is a means for preventing the second metal plate from being direct-bonded to any ceramic material other than the ceramic sheet member.

17. The method of claim 16, wherein the means comprises substantially no ceramic particles.

18. The method of claim 15, wherein the first metal plate is a copper plate that has a thin copper oxide skin, wherein the second metal plate in the placing step is a copper plate that has a thin copper oxide skin, and wherein the metal oxide layer from which the oxygen dissociates in the high-temperature direct-bonding step is the thin copper oxide skin of the second metal plate.

19. The method of claim 15, wherein each ceramic contact projection has a contact surface area of less than fifty square millimeters, and wherein less than five percent of the bottom surface of the second metal plate is in contact with the unoxidized material at the beginning of the high-temperature direct-bonding step.

20. A method comprising:
applying an amount of unoxidized material to a ceramic carrier such that each one of a plurality of ceramic contact projections of a ceramic carrier is covered with its own layer of the unoxidized material, wherein the amount of unoxidized material is applied to the ceramic carrier by:
(a) placing the ceramic carrier in contact with a unoxidized material member so that the ceramic contact projections touch the unoxidized material of the unoxidized material member; and
(b) moving the ceramic carrier with respect to the unoxidized material member such that unoxidized material is left disposed on the ceramic projections of the ceramic carrier;
placing a Direct Metal Bonded (DMB) panel stack on the ceramic carrier such that a bottom surface of a second metal plate of the stack is in contact with the layers of unoxidized material, wherein the stack comprises a ceramic sheet member, a first metal plate disposed in contact with a top surface of the ceramic sheet member, and the second metal plate disposed in contact with a bottom surface of the ceramic sheet member; and
in a high-temperature direct-bonding step, when the stack is disposed on the ceramic carrier, causing the first metal plate to be direct-bonded to the top surface of the ceramic sheet member at the same time that the second metal plate is direct-bonded to the bottom surface of the ceramic sheet member, wherein during the high-temperature direct-bonding step oxygen from a metal oxide layer of the second metal plate disassociates with metal of the second metal plate and oxidizes at least some of the unoxidized material.

21. The method of claim 20, wherein each of the ceramic contact projections has a contact surface area of less than fifty square millimeters, and wherein less than five percent of the bottom surface of the second metal plate is in contact with the unoxidized material at the beginning of the high-temperature direct-bonding step.

22. The method of claim 1, wherein the moving of the ceramic carrier with respect to the unoxidized carbon member involves resting the unoxidized carbon member on a vibrating table, applying a weight on the ceramic carrier, and causing the vibrating table to vibrate back and forth.

* * * * *